Dec. 1, 1942.  H. J. KNIGHT  2,303,560
GEAR PULLER
Filed May 13, 1940  2 Sheets-Sheet 2
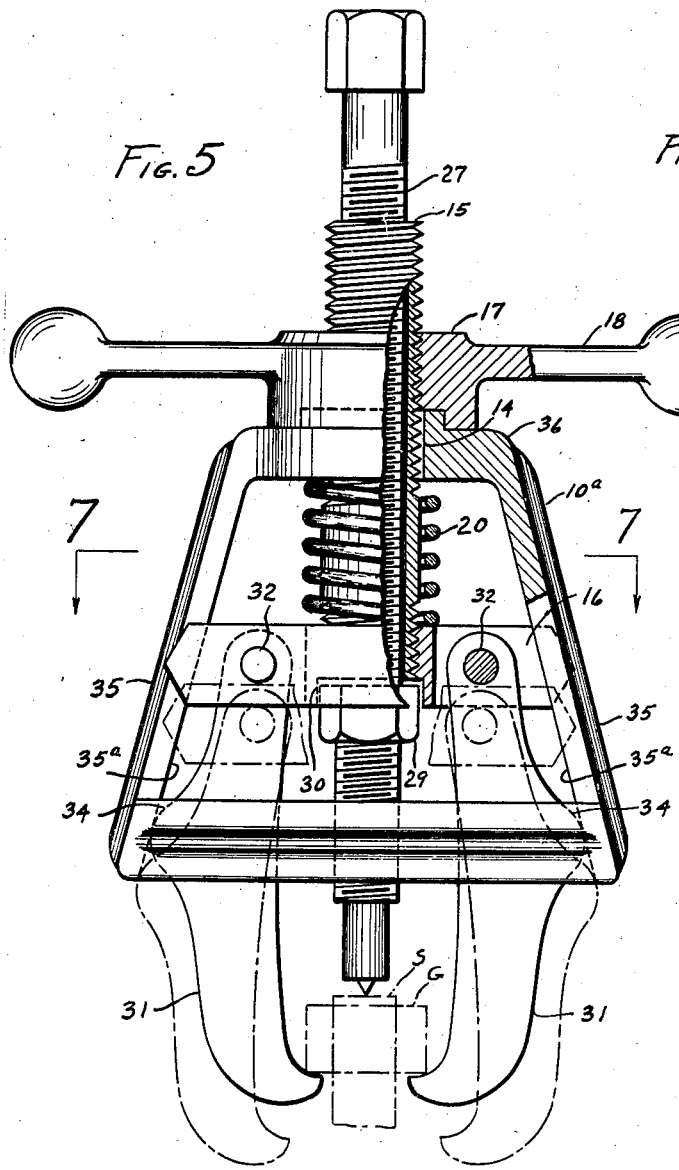
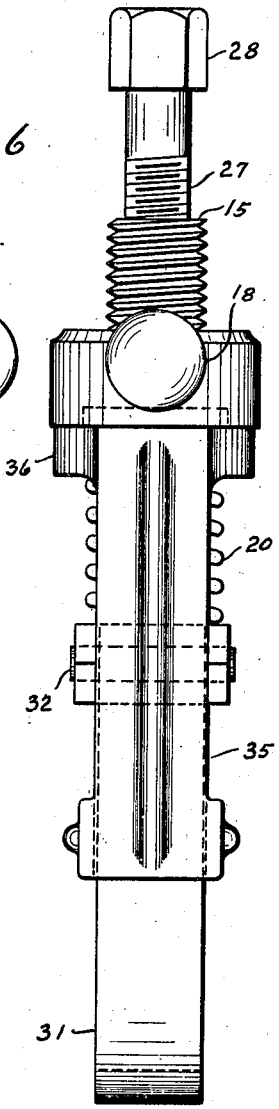
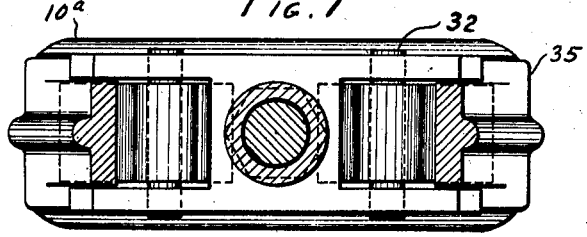
INVENTOR.
HENRY J. KNIGHT.
BY Patented Dec. 1, 1942

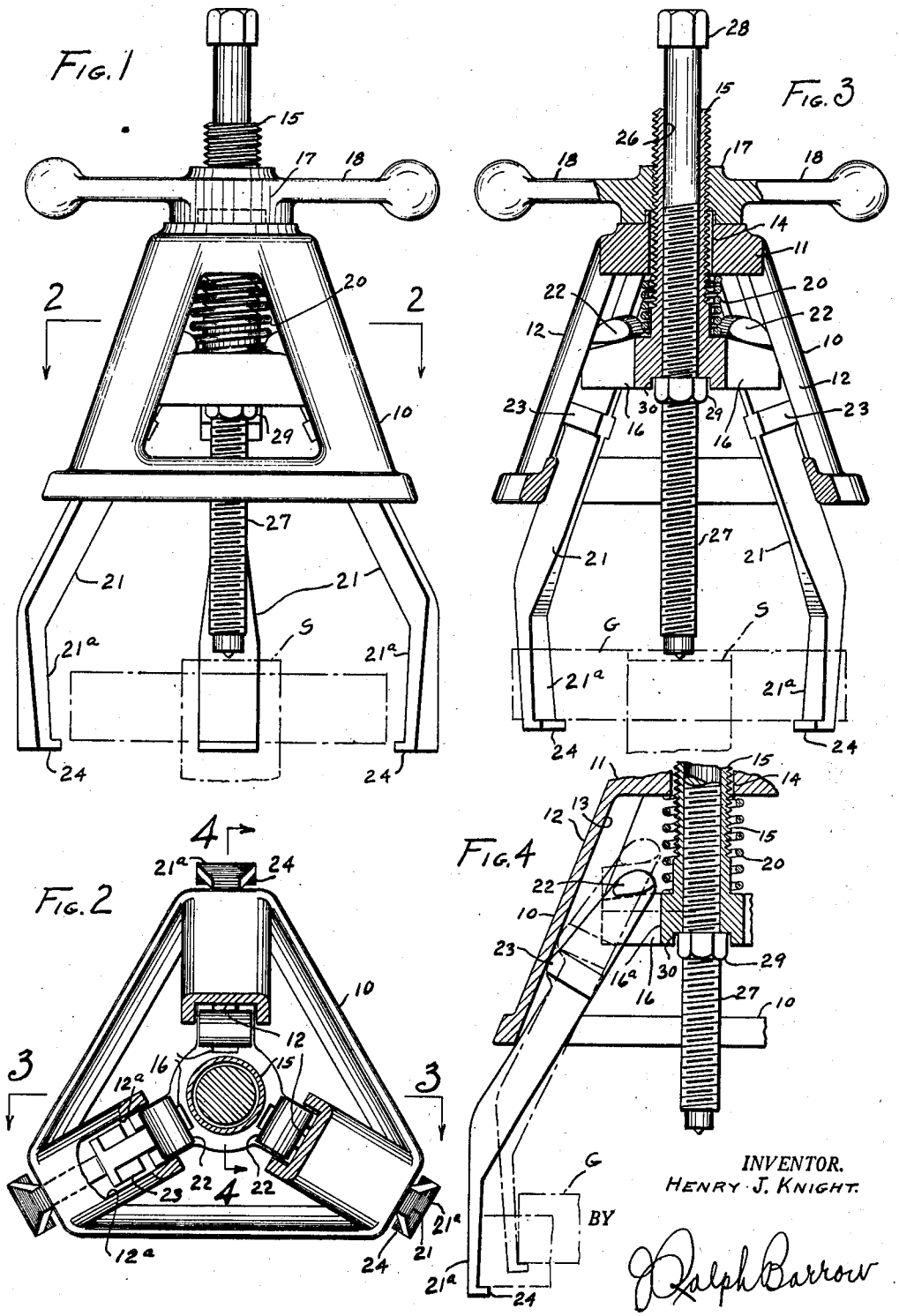

2,303,560

UNITED STATES PATENT OFFICE 2,303,560

GEAR PULLER

Henry John Knight, Toronto, Ontario, Canada, assignor of one-half to Frederick H. M. Irwin, Toronto, Ontario, Canada Application May 13, 1940, Serial No. 334,682

6 Claims. (Cl. 29—85)

This invention relates to gear or like pullers, used for removing gears, bearing races, wheels, etc., from their shafts.

An object of this invention is to provide a device of the character described in which the gripping elements are radially adjustable for effectively gripping gears or the like of a substantially wide range of sizes, without substantial tilting of the gripping elements tending to release the grip thereof.

Another object of the invention is to provide a device of the character described having gripping elements for gripping a gear or the like and independently operable means for applying opposing pressure on the end of the gear shaft to remove said gear from the shaft, said gripping elements thereby retaining their grip on the gear in all adjusted positions of said pressure applying means.

These and other objects of the invention will be manifest from the following brief description and the accompanying drawings.

Of the accompanying drawings:

Figure 1 is a front elevation of a device embodying the invention.

Figure 2 is a cross-section taken on line 2—2 of Figure 1.

Figure 3 is a cross-section taken on line 3—3 of Figure 2.

Figure 4 is a cross-section taken on line 4—4 of Figure 2.

Figure 5 is a front elevation, partly broken away and in section, of a modified form of the invention.

Figure 6 is an end view of Figure 5.

Figure 7 is a cross-section taken on line 7—7 of Figure 5.

Referring particularly to Figures 1 to 4 of the drawings, the numeral 10 designates a hollow tapered body, providing a hub portion 11 at the small end thereof and being open at the large end thereof. The body 10 may be formed with a plurality of circumferentially spaced axially extending channel-shaped portions 12, 12, providing inner guide surfaces 13, 13 which diverge outwardly from the hub 11, for purposes to be described.

Axially slidably received through a central opening 14 in hub portion 11 may be an externally threaded sleeve 15, formed at its inner end with a plurality of radially slotted lugs 16, 16, which lugs may slidably engage between the inwardly extending flanges 12a, 12a of the channel portions 12. Threaded on the outer end of the sleeve may be an adjusting nut 17 having radially extending handles 18, 18 for turning the same against the outer faces of the hub 11, thereby to move the sleeve 15 axially relatively of body 10, against the yielding action of a compression spring 20 engaging between the lugs 16 and the inner face of hub 11.

Engaged through the slots of lugs 16 may be the inner ends of gripping elements 21, 21 having heads 22 at said inner ends for engaging the top faces of the lugs, whereby the elements will pivot on said lugs. The elements 21 may be formed intermediate the ends thereof with radially outwardly projecting portions or fulcrums 23 for axial sliding engagement with the guide surfaces 13 of body 10. The outer ends of the gripping elements are formed with jaw portions 21a, the inner faces of which are substantially co-axial with the longitudinal axis of sleeve 15. The extreme outer ends of the jaw portions are formed with radially inwardly extending flanges 24 for engaging under a gear G or the like, as indicated in full lines in Figure 4, when the jaws 21a are gripped about said gear. The gripping elements are moved to grip gear G by rotation of nut 17 against hub 11, slidably to urge sleeve 15 outwardly through opening 14 in the hub, against the yielding action of spring 20, until the projections 23 are in such positions along guides 12 that engagement of jaws 21a with the gear will fulcrum or rock the elements 21 on the projections thereof, as limited by engagement of the upper end of the elements with the radially inward ends of the slots 16a of lugs 16. From this point, further tightening of nut 17 applies additional gripping action of elements 21 on the gear G. To aid in maintaining continued engagement of the fulcruming projections 23 in all axially adjusted positions of sleeve 15, the faces of the lugs 16 adjacent hub 11 may incline outwardly of the hub, as shown, thereby tending to move the head ends of the elements 21 outwardly until the elements engage the inner ends of the slots 16a.

Axially slidably received through the opening 26 in sleeve 14 may be a pressure bolt 27, having a head portion 28 on the outer end thereof engageable by a suitable tool for turning the same. Threaded on bolt 27 may be a nut 29 adapted non-rotatably to be engaged in a cooperating recess 30 in the inner end of sleeve 14, by urging or sliding the bolt outwardly of the outer end of the sleeve. With the nut 29 so engaged in recess 30 the bolt 27 may be turned relative to the nut, and hence the sleeve, to engage the free end of the bolt with the end of the gear shaft S (see Figure 3), while the elements 21 are in independent gripping engagement with the gear. Continued pressure thus applied to the end of shaft S, against opposing gripping action of the elements 21, will urge the gear G from shaft S. Heavy pressure required for urging the gear and shaft apart may also be applied as by hitting the head end of bolt 27 with a hammer, in which case the bolt will be slidably urged inwardly of sleeve 14, without disturbing the gripping engagement of elements 21 on the gear.

In the operation of the device just described, for removing a gear from a shaft, for example, the nut 17 is first backed away from hub 11 of body 10, thereby allowing spring 20 to urge sleeve 14 inwardly, and permitting the gripping elements 21 to be spread apart to engage the jaws 21ª thereof about the gear G, as shown in Figure 1. By tightening the nut 17 against hub 11, against the action of spring 20, the sleeve 14 will be slidably urged outwardly of hub, whereby the guide portions 12 of the body, by engaging projections 23, will urge the gripping elements radially inwardly, until the jaws 21ª engage. Further tightening of the nut 17 will rock the elements on said projections until the upper ends of the gripping elements engage the inner ends of slots 16ª, when the rocking action of the elements will be reversed to tighten the grip of the jaws 21ª on gear G. The bolt 27 may then be shifted outwardly in sleeve 15 until nut 29 is non-rotatably engaged in recess 30 of the sleeve, to permit turning the bolt into pressure engagement with the end of shaft S, and thereby to remove the gear G from the shaft.

As best shown in full and chain-dotted lines in Figure 4, the device is adjustable as described for removing gears of different diameters from the shafts thereof, without substantial change in the angle of the elements 21. For this purpose, the inner faces of jaws 21ª may be substantially parallel to the axis of the tool for the larger sized gears, so that inward tilting of the jaws to engage smaller gears will tend further to tighten the grip on said gears. Thus, there will be no such tilting of said elements as would cause the flanges 24 to become disengaged from under a gear G. Gripping elements of various shapes and sizes may readily be interchanged with the elements 21, for accommodating a wide variety of gear sizes.

Figures 5 to 7 show a modified form of the invention, particularly suitable for use in removing a substantial range of small gear sizes from their shafts. Inasmuch as this form of the invention is similar in most respects to that shown in Figures 1 to 4, like parts have been given like numerals, the essential difference residing in the fact that a pair of gripping elements 31 may be pivoted on pins 32 received through lugs 33 on sleeve 15. The gripping elements 31 may have outwardly projecting portions 34, for engaging inner guide surfaces 35ª of guide members 35 diverging outwardly from a hub portion 36 of a body 10ª. The elements 31 extend outwardly between spaced cross-pieces between the outer ends of members 35, axially to guide the elements, and to prevent rotation of sleeve 14 relative to hub 36. The operation of this form of the invention is substantially the same as described in connection with Figures 1 to 4, with the exception that the inner ends of the gripping elements are not free to shift on the lugs 33 during adjustments of the device to grip a gear.

Modifications of the invention may be resorted to without departing from the spirit thereof or the scope of the appended claims.

What is claimed is:

1. A gear or like puller comprising a body including a centrally apertured head and a plurality of elongated guides spaced around said head and extending downwardly from said head and generally along the extended longitudinal axis of the aperture of said head but diverging outwardly as they extend downwardly, said guides having guide portions along their inner sides facing inwardly with respect to said axis, an element having a part freely shiftable through said apertured head axially thereof, and another part located between said guides and intermediate the ends thereof, means for axially adjusting said shiftable element relatively of said head, the last named part of said shiftable element having a plurality of radial outwardly extending supporting portions one adjacent each guide, a plurality of elongated gripping elements one adjacent each guide and having its upper end pivotally associated with each supporting portion, said gripping elements extending downwardly along said guides and beyond the same and having radial outwardly projecting portions located between said supporting portions and the outer ends of the guides for engaging in the guide portions thereof, whereby shifting of said shiftable element upwardly will move said gripping elements upwardly so that the projecting portions thereof will force the extended ends thereof into gripping engagement with a gear or the like on a shaft, and means mounted for axial adjustment in said shiftable element for applying pressure to the end of the shaft in opposition to gripping action of the gripping elements on said gear or the like for pulling said gear or the like from said shaft.

2. A gear or like puller comprising a body including a centrally apertured head and a plurality of elongated guides spaced around said head and extending downwardly from said head and generally along the extended longitudinal axis of the aperture of said head but diverging outwardly as they extend downwardly, said guides having guide portions along their inner sides facing inwardly with respect to said axis, an element having a part freely shiftable through said apertured head axially thereof, and another part located between said guides and intermediate the ends thereof, means for axially adjusting said shiftable element relatively of said head, the last named part of said shiftable element having a plurality of radial outwardly extending supporting portions one adjacent each guide, a plurality of elongated gripping elements one adjacent each guide and having its upper end pivotally associated with each supporting portion, said gripping elements extending downwardly along said guides and beyond the same and having radial outwardly projecting portions located between said supporting portions and the outer ends of the guides for engaging in the guide portions thereof, whereby shifting of said shiftable element upwardly will move said gripping elements upwardly so that the projecting portions thereof will force the extended ends thereof into gripping engagement with a gear or the like on a shaft, and means mounted for axial adjustment in said shiftable element for applying pressure to the end of the shaft in opposition to gripping action of the gripping elements on said gear or the like for pulling said gear or the like from said shaft, said means for adjusting said shiftable element comprising a screw thereon, a nut on said screw adapted to be turned against said head, and yielding means for urging said shiftable element to retain said nut against said head.

3. A gear or like puller comprising a body including a centrally apertured head and a plurality of elongated guides spaced around said head and extending downwardly from said head and generally along the extended longitudinal axis of the aperture of said head but diverging outwardly as they extend downwardly, said guides having guide portions along their inner sides facing inwardly with respect to said axis, an element having a part freely shiftable through said apertured head axially thereof, and another part located between said guides and intermediate the ends thereof, means for axially adjusting said shiftable element relatively of said head, the last named part of said shiftable element having a plurality of radial outwardly extending supporting portions one adjacent each guide, said supporting portions having radial slots therein, a plurality of elongated gripping elements one adjacent each guide and having its upper end pivotally associated with each supporting portion, said gripping elements having enlarged ends fulcrumed on said supporting portion and the gripping elements extending through the radial slots thereof so as to be radially shiftable in the slots, said gripping elements extending downwardly along said guides and beyond the same and having radial outwardly projecting portions located between said supporting portions and the outer ends of the guides for engaging in the guide portions thereof, whereby shifting of said shiftable element upwardly will move said gripping elements upwardly so that the projecting portions thereof will force the extended ends thereof into gripping engagement with a gear or the like on a shaft, and means mounted for axial adjustment in said shiftable element for applying pressure to the end of the shaft in opposition to gripping action of the gripping elements on said gear or the like for pulling said gear or the like from said shaft.

4. A gear or like puller comprising a body including a centrally apertured head and a plurality of elongated guides spaced around said head and extending downwardly from said head and generally along the extended longitudinal axis of the aperture of said head but diverging outwardly as they extend downwardly, said guides having guide portions along their inner sides facing inwardly with respect to said axis, an element having a part freely shiftable through said apertured head axially thereof, and another part located between said guides and intermediate the ends thereof, means for axially adjusting said shiftable element relatively of said head, the last named part of said shiftable element having a plurality of radial outwardly extending supporting portions one adjacent each guide, said supporting portions having radial slots therein a plurality of elongated gripping elements one adjacent each guide and having its upper end pivotally associated with each supporting portion, said gripping elements having enlarged ends fulcrumed on said supporting portion and the gripping elements extending through the radial slots thereof so as to be radially shiftable in the slots, said gripping elements extending downwardly along said guides and beyond the same and having radial outwardly projecting portions located between said supporting portions and the outer ends of the guides for engaging in the guide portions thereof, whereby shifting of said shiftable element upwardly will move said gripping elements upwardly so that the projecting portions thereof will force the extended ends thereof into gripping engagement with a gear or the like on a shaft, and means mounted for axial adjustment in said shiftable element for applying pressure to the end of the shaft in opposition to gripping action of the gripping elements on said gear or the like for pulling said gear or the like from said shaft, said supporting portions having outwardly sloping surfaces on which the enlarged ends of said gripping elements fulcrum.

5. A puller comprising a body including a centrally apertured head and a plurality of elongated guides spaced around said head said guides extending downwardly from said head and generally along the extended longitudinal axis of the aperture of said head, but diverging outwardly as they extend downwardly, said guides having guide channels along their inner sides facing inwardly with respect to said axis, an element having a part axially shiftably received through said apertured head and another part located in between said guides and intermediate the ends thereof, means for axially adjusting said shiftable element relatively of said head, said latter part of said shiftable element having a plurality of radial outwardly extending supporting portions one adjacent each guide a plurality of elongated gripping elements one adjacent each guide, said gripping elements having each of its upper ends pivotally related to its corresponding supporting portion, said gripping elements extending downwardly along said guides and beyond the same and having radial outwardly projecting portions located between said supporting portions and the outer ends of said guides for engaging in the channels of said guides, whereby a shifting of said shiftable element upwardly will move said gripping elements upwardly so that the projections thereof, in said diverging guide channels, will force the extended ends thereof into gripping engagement with an article that is to be pulled from a shaft, gripping means on the extended ends of said gripping elements, and means mounted axially in said shiftable element and adjustable along the axis of the aperture of said head for applying pressure against the end of the shaft in opposition to gripping action of the gripping elements on the article that is mounted on the shaft for separating the article from its shaft.

6. A gear or like puller comprising a body including a centrally apertured head and a plurality of elongated guides spaced around said head and extending downwardly from said head and generally along the extended longitudinal axis of the aperture of said head but diverging outwardly as they extend downwardly, said guides having guide portions along their inner sides facing inwardly with respect to said axis, an element having a part freely shiftable through said apertured head axially thereof, and another part located between said guides and intermediate the ends thereof, means for axially adjusting said shiftable element relatively of said head, the last named part of said shiftable element having a plurality of radial outwardly extending supporting portions one adjacent each guide, a plurality of elongated gripping elements one adjacent each guide and having its upper end pivotally associated with each supporting portion, said gripping elements extending downwardly along said guides and beyond the same and having radial outwardly projecting portions located between said supporting portions and the outer ends of the guides for engaging in the guide portions thereof, whereby shifting of said shiftable element upwardly will move said gripping elements upwardly so that the projecting portions thereof will force the extended ends thereof into gripping engagement with a gear or the like on a shaft, and means mounted for axial adjustment in said shiftable element for applying pressure to the end of the shaft in opposition to gripping action of the gripping elements on said gear or the like for pulling said gear or the like from said shaft, said pressure applying means comprising a screw threaded through said shiftable member and having a non-circular nut threaded thereon, said shiftable member having a non-circular socket therein so as non-rotatively to receive said nut.

HENRY JOHN KNIGHT.